Oct. 2, 1962  J. R. BUCK  3,056,609

DRILL CHUCK

Filed June 13, 1960

INVENTOR.
JAMES R. BUCK

BY Woodhams, Blanchard & Flynn

ATTORNEYS 3,056,609
DRILL CHUCK
James R. Buck, Richland Township, Kalamazoo County, Mich., assignor to Buck Tool Company, Kalamazoo, Mich., a corporation of Michigan
Filed June 13, 1960, Ser. No. 35,758
2 Claims. (Cl. 279—1)

This invention relates to a tool or work-holding device which is particularly adapted for use with relatively small and round articles, such as drills.

While a very large number of tool and/or work-holding devices of the nature of chucks have been offered to the machine tool industry, there is still, and long has been, a need for a relatively small, simple and inexpensive device of this nature for use with relatively small round articles such as drills. Particularly it is desirable to provide a chuck of this type which can be set as desired for an item of work or a tool of a particular chosen size and wherein successive subsequent ones of a large number of such items may be inserted quickly and easily and without varying any of the adjustments in any way.

Accordingly, the major objects of the invention are:

(1) To provide a work or tool holder of the chuck type wherein a plurality of devices to be held may be successively inserted and removed, all without modifying or changing any of the externally, controllable parts.

(2) To provide a tool or work holder, as aforesaid, of the chuck type for substantially constant diameter, production uses.

(3) To provide a tool or work holder of the chuck type, as aforesaid, which may be initially adjusted as desired and which will thereafter resiliently hold the article being held so that it may be easily removed and a new one inserted.

(4) To provide a device, as aforesaid, having jaws which will be controllable for opening and closing thereof by easily applied automatic, external means, such as a cam, cam or solenoid actuated roller or a pressure fluid actuated cylinder.

(5) To provide a tool or work holder of the chuck type, as aforesaid, which is sufficiently similar to prior conventional devices in its general appearance and manner of use that it can be readily operated by workmen accustomed to the use of present conventional chucks.

(6) To provide a work or tool holder, as aforesaid, of the chuck type which can be readily applied to the chuck backplates of present conventional machines and will function efficiently when mounted thereon.

(7) To provide a device, as aforesaid, which will be relatively simple and thereby of maximum economy in both original construction and in the maintainence thereof in good operating condition.

(8) To provide a device, as aforesaid, which is capable of being manufactured sturdily and efficiently from relatively from relatively simple parts.

Further objects and purposes of the invention will be evident to persons acquainted with devices of this general type upon reading the following disclosure and inspection of the accompanying drawings.

Figure 1:
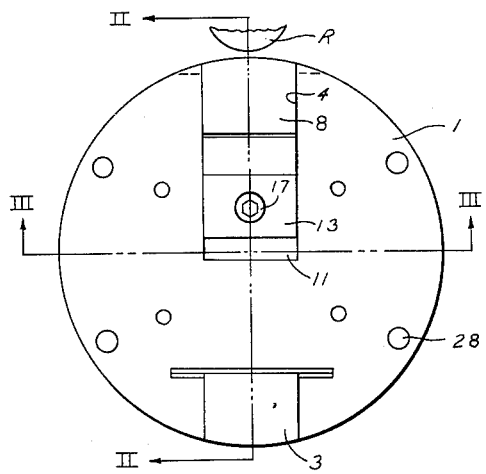
FIGURE 1 is an elevational view of an embodiment of the invention viewed from the jaw end thereof.
Figure 2:
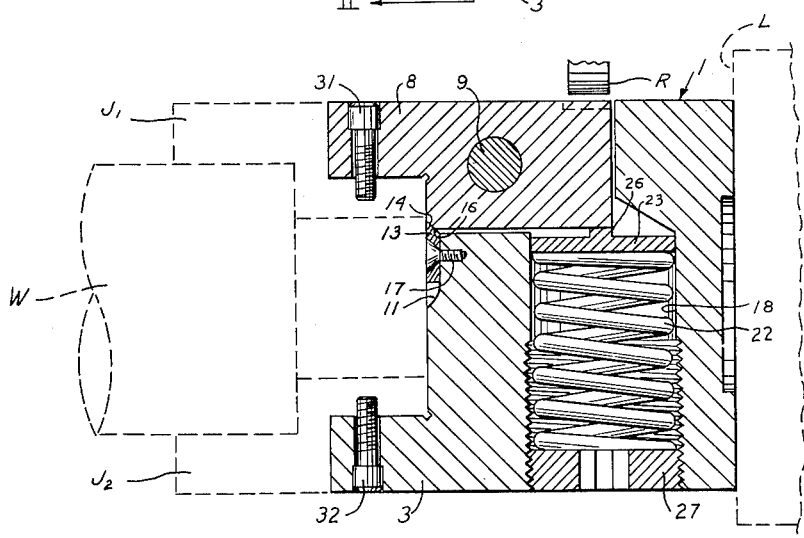
FIGURE 2 is a section taken on the line II—II of FIGURE 1.
Figure 3:
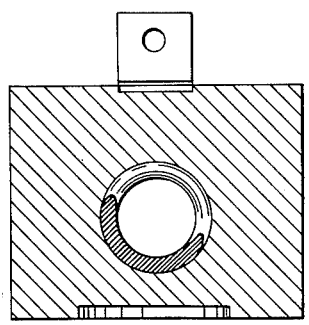
FIGURE 3 is a section taken on the line III—III of FIGURE 1.

Referring now to the drawings, there is provided a chuck body 1, which is usually cylindrical but may be of other suitable shapes, having at least two radially aligned, oppositely positioned jaw holders 3 and 8 arranged thereon for receiving selected jaws as desired. The first jaw holder 3 is affixed rigidly to said chuck body 1 by any convenient means, such as by being made integral therewith. The second jaw holder 8 is received pivotally within a radially aligned slot 4 and is pivotally held therein by a pin 9. Sufficient clearance is provided between the radially inner surface of said jaw holder 8 and the bottom of the slot 4 to permit limited, but only limited, movement of said jaw holder in a radial plane.

A notch 11 is cut into the forward face of the chuck body 1 and extends a short distance inwardly from the inner end of the slot 4. A dust shield 13 is received within said slot, has a beveled surface 14 snugly engaging a correspondingly beveled surface 16 on the jaw holder 8 and is held within said notch 11 by a screw 17.

A diametric opening 18 of relatively large size is provided through the chuck body 1 and communicates between the bottom of the slot 4 and the diametrically opposite surface of the body. A resilient member 22, here a coil spring, is located within said opening and bears through a bearing member 23 against the inner side of the jaw holder 8 near its rearward end. Said bearing member is here substantially cylindrical and is received for smooth sliding movement within said opening 18 and has a tip 26 thereon for effecting contact between said bearing member 23 and the jaw holder 8. A back-up member 27 is located immediately outwardly of said resilient member and is adjustably, here threadedly, related to the walls of said opening, whereby radial adjustment of said back-up member will adjust the force by which said spring bears against the rearward end of said jaw holder.

Suitable means, such as suitable bolt openings of which one is shown at 28, are provided for enabling holding devices, such as suitable bolts (not shown), to fasten the body member 1 to an appropriate mounting device, such as the lathe backing member indicated in broken lines at L.

Suitable jaws designed according to the article to be held by the chuck of the invention are provided and fastened in any convenient manner to the jaw holders. In this embodiment, inwardly facing jaws J1 and J2 are provided and are fastened to the jaw holders by machine screws 31 and 32. So fitted, the device is adapted to hold the workpiece W, which in this instance may be considered to be generally cylindrical, such as the shank of a drill.

To insert a workpiece W into position between the jaws J1 and J2, the workpiece may be manually pressed against the jaw J1 which is mounted on the movable jaw holder 8 sufficiently to urge said jaw holder around the pivot 9 and against the resilient member 22, or the jaws are opened by mechanical means hereinafter mentioned. Said workpiece W is then moved into place between the jaws and, upon the release of the pressure urging the jaw holder 8 in an opening direction, the resilient member 22 will urge said jaw holder 8 around the pivot 9 in a manner to urge it toward the jaw holder 3 and thereby grip the workpiece firmly under the force of the resilient member 22.

When said workpiece is to be removed from the jaws, any suitable external means are provided to rotate the jaw holder 8 against the resilient member 22. For example, a cam, a manually operated device or an air cylinder operated roller R (shown in retracted position) may be caused to bear against the outer side of the jaw holder 8 near its rearward end at desired times to open the jaws mechanically. Upon withdrawal of such roller, the resilient member 22 will again move said jaw J1 toward jaw J2.

By using a resilient member 22 of properly selected strength, said chuck can be caused to hold the work with sufficient firmness to meet a large number of conditions and since successive pieces of work of identical size can be rapidly inserted and withdrawn therefrom, it wll have a wide range of usefulness for many types of production jobs.

It is conventional practice to fit various types of jaws to the jaw holders within presently known chucks. Thus, it will be well recognized by persons acquainted with apparatus of this general type that many types of jaws may replace the specific jaw structures indicated at J1 and J2 and, hence, need no further elaboration.

While a particular preferred embodiment of the invention has been described above, the invention contemplates such modifications or changes therein as lie within the scope of the appended claims.

What is claimed is:

1. In a chuck for receiving, holding and releasing a succession of substantially identical workpieces, the combination comprising:

a cylindrical body member;

a first jaw holder fixed rigidly with respect to said body member and offset from the axis thereof;

means defining a slot within said body member radially positioned therein and located diametrically of said body member with respect to said first jaw holder;

a second jaw holder within said slot arranged for pivotal movement in a radial plane within said slot about a pivot axis located between the ends of said second jaw holder and so positioned that one end of said second jaw holder is substantially diametrically aligned with said first jaw holder and said one end of said second jaw holder is movable toward and away from said first jaw holder;

means defining an opening extending from the bottom of said slot, at a point therein substantially adjacent the other end of said second jaw holder, diametrically through said body member to the exterior thereof;

resilient means arranged within said opening and a member slidably disposed in said opening and located between and being in engagement with one end of said resilient means and said other end of said second jaw holder;

said opening being threaded adjacent the other end of said resilient means; and back-up means within said opening for holding said resilient means under compression and in place, said back-up means comprising a plug threaded into the threaded portion of said opening and engaging the other end of said resilient means whereby said resilient means may be compressed to an adjustable value and thereby said one end of said second jaw holder may be urged toward said first jaw holder under an adjustable pressure.

2. In a chuck for receiving, holding and releasing a succession of substantially identical workpieces, the combination comprising:

a cylindrical body member;

a first jaw holder fixed rigidly with respect to said body member and offset from the axis thereof;

means defining a slot within said body member radially positioned therein and located diametrically of said body member with respect to said first jaw holder;

a second jaw holder within said slot arranged for pivotal movement in a radial plane within said slot about a pivot axis located between the ends of said second jaw holder and so positioned that one end of said second jaw holder is substantially diametrically aligned with said first jaw holder and said one end of said second jaw holder is movable toward and away from said first jaw holder;

said first and second jaw holders including axially extending, substantially parallel, spaced portions;

fastening means extending transversely through said portions for securing chuck jaws thereto;

means defining an opening extending from the bottom of said slot, at a point therein substantially adjacent the other end of said second jaw holder, diametrically through said body member to the exterior thereof;

means including resilient means arranged within said opening and bearing against said other end of said second jaw holder; and back-up means within the outer portion of said opening for holding said resilient means under compression and in place, said back-up means being adjustable for adjusting the compression of said resilient means.

References Cited in the file of this patent

UNITED STATES PATENTS

| | | |
|---|---|---|
| 283,745 | Bartlett | Aug. 28, 1883 |
| 1,813,723 | Beaver | July 7, 1931 |
| 1,879,058 | Brockman | Sept. 27, 1932 |
| 1,904,903 | Sweet | Apr. 18, 1933 |
| 2,682,414 | Richardson | June 29, 1954 |